(12) United States Patent
Smith

(10) Patent No.: US 8,745,224 B2
(45) Date of Patent: *Jun. 3, 2014

(54) METHOD AND APPARATUS FOR DYNAMIC PROVISIONING OF AN ACCESS CONTROL POLICY IN A CONTROLLER HUB

(75) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

This patent is subject to a terminal disclaimer.

(21) Appl. No.: 11/321,271

(22) Filed: Dec. 28, 2005

(65) Prior Publication Data

US 2007/0150559 A1 Jun. 28, 2007

(51) Int. Cl.
G06F 15/173 (2006.01)
G06F 15/16 (2006.01)

(52) U.S. Cl.
USPC ........... 709/225; 709/206; 709/224; 709/228; 709/229

(58) Field of Classification Search
USPC .......................... 709/201–204, 206, 220–229
See application file for complete search history.

(56) References Cited

U.S. PATENT DOCUMENTS

| | | | | |
|---|---|---|---|---|
| 5,692,219 A * | 11/1997 | Chan et al. | ....................... | 710/49 |
| 6,347,375 B1 * | 2/2002 | Reinert et al. | .................. | 726/24 |
| 6,647,434 B1 * | 11/2003 | Kamepalli | ...................... | 710/14 |
| 7,210,034 B2 * | 4/2007 | Smith | ........................... | 713/155 |
| 7,210,169 B2 * | 4/2007 | Smith et al. | ...................... | 726/28 |
| 7,228,368 B2 * | 6/2007 | Lin et al. | .......................... | 710/38 |
| 7,373,509 B2 * | 5/2008 | Aissi et al. | ..................... | 713/168 |
| 7,467,205 B1 * | 12/2008 | Dempster et al. | ............. | 709/224 |
| 7,526,794 B2 * | 4/2009 | Chand et al. | ....................... | 726/2 |
| 7,546,452 B2 * | 6/2009 | Aissi et al. | ..................... | 713/156 |
| 7,574,600 B2 * | 8/2009 | Smith | ........................... | 713/168 |
| 8,180,923 B2 * | 5/2012 | Smith et al. | .................... | 709/250 |
| 8,356,175 B2 * | 1/2013 | Smith et al. | .................... | 713/168 |
| 2004/0088493 A1 * | 5/2004 | Glasco | ........................... | 711/141 |
| 2004/0107360 A1 * | 6/2004 | Herrmann et al. | ............. | 713/201 |
| 2004/0117616 A1 * | 6/2004 | Silvester | ........................ | 713/155 |
| 2004/0137893 A1 * | 7/2004 | Muthuswamy et al. | ....... | 455/419 |
| 2004/0139259 A1 * | 7/2004 | Mantey et al. | ................. | 710/113 |
| 2004/0148461 A1 * | 7/2004 | Steinmetz et al. | ............. | 711/114 |

(Continued)

OTHER PUBLICATIONS

"Enumerate Installed Devices Using Setup API". Riazi A. http://www.codeproject.com/KB/system/EnumDevices.aspx Last Update: Mar. 16, 2004.*

(Continued)

*Primary Examiner* — Ashok Patel
*Assistant Examiner* — Kevin Bechtel
(74) *Attorney, Agent, or Firm* — Blakely, Sokoloff, Taylor & Zafman LLP

(57) ABSTRACT

A method and apparatus for dynamic provisioning of an access control policy in an input/output (I/O) controller hub are described. In one embodiment, the method includes the establishment of a control channel during evaluation stages of a network access request. In one embodiment, the control channel enables resource enumeration of a hardware platform while disabling data read/write processing of the hardware platform. Once resource enumeration is completed, conditional control settings for each enumerated platform resource are sent to a network policy decision point. Once transmitted, if the conditional control settings identify the hardware platform as having a non-compliant configuration, conditional control settings for at least one enumerated resource of the hardware platform are modified according to a received access control policy to provide compliance of the hardware platform configuration to enable network access. Other embodiments are described and claimed.

12 Claims, 6 Drawing Sheets

(56) References Cited

U.S. PATENT DOCUMENTS

| | | | |
|---|---|---|---|
| 2004/0167984 A1* | 8/2004 | Herrmann | 709/229 |
| 2004/0212503 A1* | 10/2004 | Stilp | 340/572.1 |
| 2005/0097199 A1* | 5/2005 | Woodard et al. | 709/223 |
| 2005/0260996 A1* | 11/2005 | Groenendaal | 455/445 |
| 2005/0262562 A1* | 11/2005 | Gassoway | 726/22 |
| 2005/0276228 A1* | 12/2005 | Yavatkar et al. | 370/242 |
| 2007/0006309 A1* | 1/2007 | Herbert et al. | 726/24 |
| 2007/0050842 A1* | 3/2007 | Smith et al. | 726/12 |
| 2007/0143824 A1* | 6/2007 | Shahbazi | 726/1 |

OTHER PUBLICATIONS

"How To: Manage Devices in Windows XP". Microsoft. http://web.archive.org/web/20041205054151/http://support.microsoft.com/kb/283658 Last Update: Apr. 16, 2004.*

"New Inside the PC". Peter Norton; Scott H. A. Clark. Published by: Sams. Apr. 12, 2002. Section: Understanding PC Memory →Various Flavors of RAM.*

"PCI Express System Architecture". Budruk, Ravi. ISBN: 0-321-15630-7 Published by: Addison-Wesley Copyright © 2004 by MindShare, Inc.*

Grewal, Ken. "802.1 AE/AF Platform considerations". IEEE 802.1 Plenary, Nov. 2004. <http://www.ieee802.org/1/files/public/docs2004/ae-grewal-linksec-observations-1104.ppt>.*

Durham et al., "Techniques for Authenticated Posture Reporting and Associated Enforcement of Network Access," U.S. Appl. No. 11/174,205, filed Jun. 30, 2005.

Herbert et al., "Methods, Apparatuses, and Systems for the Dynamic Evaluation and Delegation of Network Access Control," U.S. Appl. No. 11/171,593, filed Jun. 29, 2005.

* cited by examiner

METHOD AND APPARATUS FOR DYNAMIC PROVISIONING OF AN ACCESS CONTROL POLICY IN A CONTROLLER HUB

FIELD

One or more embodiments relate generally to the field of integrated circuit and computer system design. More particularly, one or more of the embodiments relate to a method and apparatus for dynamic provisioning of an access control policy in a controller hub.

BACKGROUND

Securing corporate networks from attack has become evermore essential as networking has evolved to support both wired and wireless access. For example, global corporations may support thousands of employees and contractors all over the world, resulting in workers and contractors that are mobile and unwired. As a result, network access for such employees depends more and more upon wireless local area networks (WLANs) and wide area networks (WANs), as well as virtual private networks (VPN) for remote access. Unfortunately, each of these technologies creates the potential to expose a network perimeter to threats.

Such threats from malware (e.g., computer viruses, Trojan horses, worms) continue to grow, which provides every increasing challenges to network administrators to provide network security. Current detection techniques are generally reactive and are designed to react to known malware that has been spread. That is, when malware is discovered, identifying characteristics are used to identify future instructions of the malware. Applying this detection technique to a network may allow the spread of malware under some conditions.

In spite of the threats posed by such malware, current network access control (NAC) architectures are typically limited to static roll designations that usually correspond to a particular class of device (e.g., access requests or common policy enforcement point, access server, policy decision point). Furthermore, the definition of network boundaries is implicitly defined by topology of devices acting as policy enforcement points.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for dynamic provisioning of an access control policy in an input/output (I/O) controller hub are described. In one embodiment, the method includes the establishment of a control channel during evaluation stages of a network access request. In one embodiment, the control channel enables resource enumeration of a hardware platform while disabling data read/write processing of the hardware platform. Once resource enumeration is completed, conditional control settings for each enumerated platform resource are sent to a network policy decision point. Once transmitted, if the conditional control settings identify the hardware platform as having a non-compliant configuration, conditional control settings for at least one enumerated resource of the hardware platform are modified according to a received access control policy to provide compliance of the hardware platform configuration to enable network access.

In the following description, certain terminology is used to discuss features of the present invention. For example, a "platform" includes any product that performs operations for subsequent analysis and verification of the product's boot process. Examples of the platform include, but are not limited or restricted to a computer (e.g., desktop, a laptop, a server, a workstation, a personal digital assistant or other hand-held, etc.); communication equipment (e.g., wireless handset, facsimile, etc.); a television set-top box and the like. A "link" is broadly defined as one or more information-carrying mediums such as electrical wire, optical fiber, cable, trace, or even a wireless channel using infrared, radio frequency (RF), or any other wireless signaling mechanism.

In addition, the term "information" is defined as one or more bits of data, address, and/or control. A "software module" includes code that, when executed, performs a certain function. Examples of a software module include an application, an applet, or even a series of code instructions, possibly a subset of code from an applet, acting as a lesser sized software module.

Figure 1:
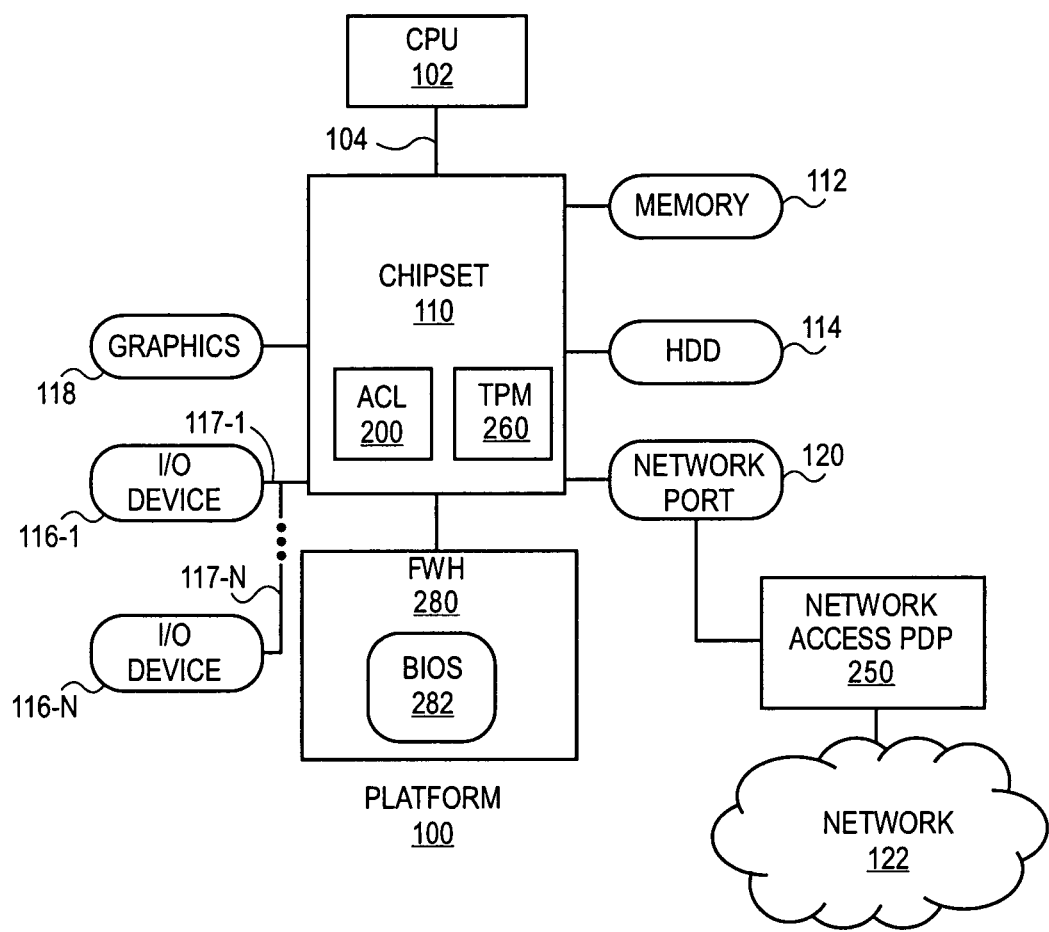
FIG. 1 is a block diagram illustrating a platform, including access control logic (ACL), to enable dynamic provisioning of an access control policy in a controller hub according to one embodiment.

FIG. 1 is a block diagram further illustrating platform 100 including an access control logic (ACL) 200 to enable dynamic provisioning of an access control policy in a controller hub, in accordance with one embodiment. Representatively, platform 100 comprises a processor system bus (front side bus (FSB)) 104 for communicating information between processor (CPU) 102 and chipset 110. In one embodiment, CPU 102 may be a multicore processor to provide a symmetric multiprocessor system (SMP). As described herein, the term "chipset" is used in a manner to collectively describe the various devices coupled to CPU 102 to perform desired system functionality.

Representatively, graphics block 118, hard drive devices (HDD) 114, and main memory 112 may be coupled to chipset 110. In one embodiment, chipset 110 is configured to include a memory controller hub (MCH) and/or an input/output (I/O) controller hub (ICH) to communicate with I/O devices 116 (116-1, . . . , 116-N). In an alternate embodiment, chipset 110 is or may be configured to incorporate graphics block 118 and operate as a graphics memory controller hub (GMCH). As described herein, a "controller hub" may refer to a chipset, an MCH, an ICH, GMCH or other like hardware configuration having one or more attached input/output (I/O) devices.

In one embodiment, main memory 112 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. Client platform further includes firmware hub (FWH) 280, which may include a basic input/output system (BIOS) 282, which is modified to perform, in addition to initialization of client platform, initialization of ACL 200 to enable dynamic provisioning of an access control policy within, for example, chipset 110, according to one embodiment.

As further illustrated in FIG. 1, chipset 110 may include network port 120, which may include a wired/wireless network interface card (NIC) or other like device for issuing a network connectivity request for access to network 122. In one embodiment, client platform 100 requests connectivity via an 801.1X control channel, for example, as described according to Institute of Electronic and Electrical Engineers (IEEE) Standard 802.1X-2001, ("Port-Based Network Access Control") approved Jun. 14, 2001, referred to herein as the "802.1X Standard." In one embodiment, in response to a network connectivity request from client platform 100, network access policy decision point (PDP) 250 requires platform configuration status from client platform 100 prior to granting the network access request.

In one embodiment, such platform configuration status may include information regarding attached busses, point-to-point links ("interconnects"), peripheral devices, controllers or other like resources of chipset 110, collectively referred to herein as "enumerated platform resources." In one embodiment, the network access request requires a report from ACL 200, which includes a status bit for each enumerated platform resource of chipset 110. In one embodiment, the status bit indicates whether the enumerated platform resource is enabled/disabled for system use. In response to such platform configuration status information, PDP 250 may evaluate such platform status configuration and compare it to an enterprise policy for properly configured clients in terms of supported peripherals, busses and interconnects.

Accordingly, in one embodiment, ACL 200 combines network access control (NAC) technology with, for example, chipset switching capabilities resulting in the ability for enterprise information technology (IT) personnel to provision a peripheral oriented access control policy as part of a network access request. In other words, such enterprise IT personnel may program a network access PDP 250 to ensure that one or more enumerated platform resources of a requesting client configuration are disabled prior to access to the network 122. Disabling of such devices may be required according to an enterprise IT policy to secure network 122 from threats, such as malware (e.g., computer viruses, Trojan horses, worms).

Figure 3:
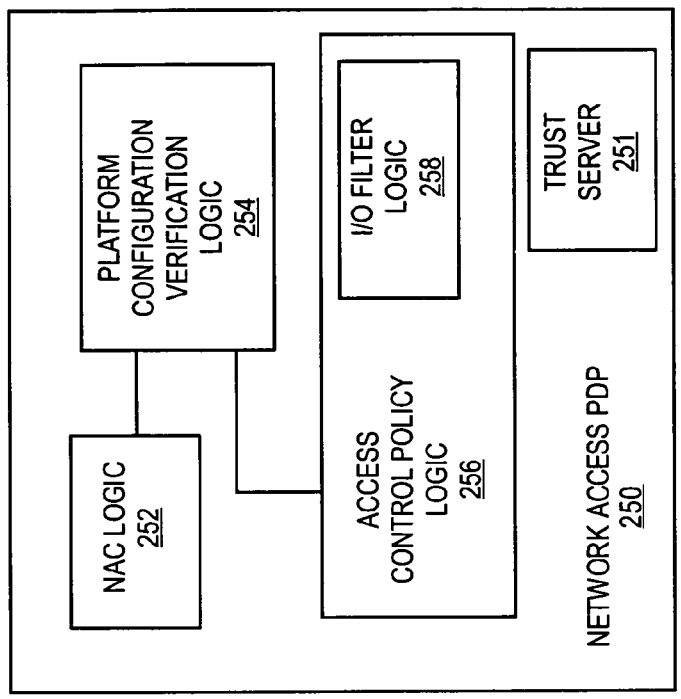
FIG. 3 is a block diagram further illustrating network policy decision point (PDP) of FIG. 1, in accordance with one embodiment.
Figure 2:
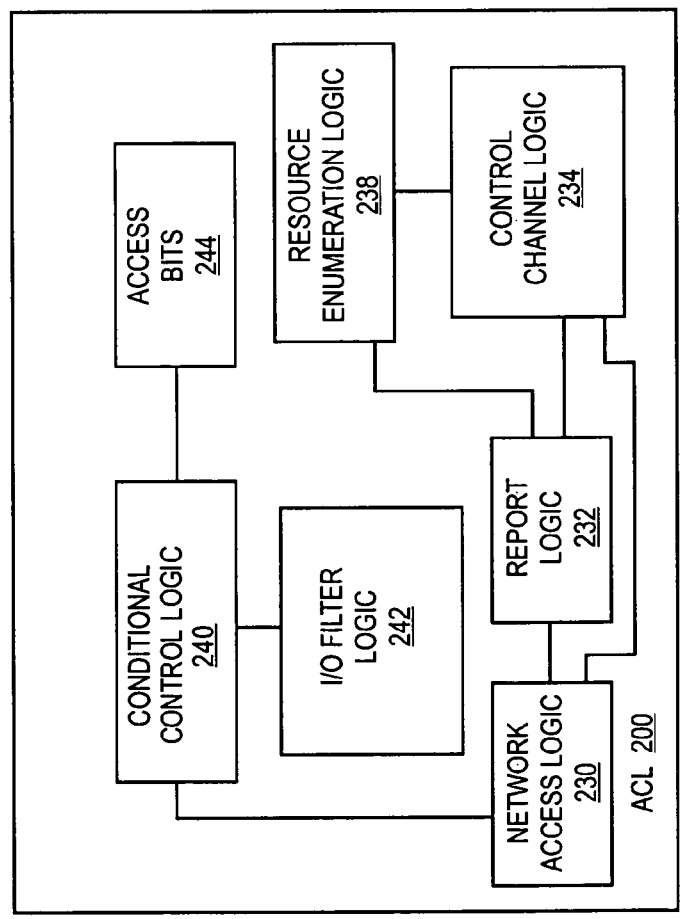
FIG. 2 is a block diagram further illustrating access control logic of FIG. 1, in accordance with one embodiment.

Details regarding ACL 200 and network access PDP 250 are illustrated according to one embodiment in FIGS. 2 and 3. In one embodiment, network access PDP 250 may first establish trust of client platform 100, including ACL 200, prior to processing of the network access request issued by client platform 100. Trust is established when a first entity (e.g., a program executing on behalf of a person or organization) acquires a basis to believe that the status, configuration and responses received from a second entity (e.g., a personal computer) are precisely as they are represented to the first entity. The Trusted Computing Group (TCG) has developed a standard to provide the industry with a set of operation conditions that enables trust in computer platforms and environments.

In accordance with a TCG Specification entitled "Main Specification Version 1.2b," published on or around Apr. 28, 2004, each personal computer (PC) is implemented with a trusted hardware device referred to as a Trusted Platform Module (TPM). The proposed behavior of a TCG enabled device requires roots of trust or components that must be trusted because misbehavior of such components may not be detected. As defined by the TCG, there are commonly three roots of trust in a trusted platform: a root of trust for measurement (RTM), a root of trust for storage (RTS) and a root of trust for reporting (RTR). The root of trust for storage, or RTS, protects keys and data entrusted to the TPM. The RTS manages a small amount of volatile memory where keys are held while performing signing and decryption operations. Inactive keys may be encrypted and moved off-chip to make room for other more active keys. Representatively, client platform 100 may include TPM 260 integrated on chipset 110.

FIG. 2 is a block diagram further illustrating access control logic or ACL 200 of FIG. 1 according to one embodiment. Representatively, ACL 200 may include network access logic 230, which is responsible for issuing a network connectivity request for access to network 122. In response to such network access request, ACL 200 may receive a request to provide network access control (NAC) authentication extensions to typical 802.1X Standard authentication methods. In one embodiment, communication of such information may occur through an extensible authentication protocol (EAP) inner method and/or the use of, for example, tag-length-Valu (TLV), attribute-value-pair (AVP) messaging supported by tunneling EAP methods or other like secure communication.

In one embodiment, ACL 200, in response to a request for platform configuration status, may use report logic 232 to provide platform configuration status regarding the configuration of attached controllers, peripherals, resources, devices busses and interconnects to chipset 110, as shown in FIG. 1. In one embodiment, resource enumeration logic 238 is responsible for enumerating each of the resources attached to chipset 110, referred to herein as "enumerated platform resources." In one embodiment, control channel logic 234 enables the creation of a control channel, causing each enumerated platform resource to be rendered inaccessible during the evaluation stages of the network access request.

As described herein, the evaluation stages of the network access request may refer to the point at which the client platform issues the network connectivity request until such time that the network connection request is granted by PDP 250, for example, as shown in FIGS. 1 and 3. During the time the control channel is established, status of connected peripherals may be returned "out of band" (over the control channel). Accordingly, in one embodiment, while the control channel is established, enumerated platform resources are disabled, such that no reads or writes may be processed by client platform 100.

In one embodiment, the report logic 232 may generate platform configuration status, which includes a status bit for each enumerated platform resource of client platform 100. In one embodiment, the status bit to indicate whether the enumerated platform resource is enabled/disabled for a system use. Accordingly, in one embodiment, such status bits, which may be referred to herein as "access bits," may refer to one or more bits associated with each attached peripheral device, resource or bus (enumerated platform resources).

Accordingly, in one embodiment, associated with each enumerated platform resource of client platform 100 are one or more bits describing whether the device may send transactions (transmit (tx) bits) and one or more bits to determine if the enumerated platform resource may receive transactions or transmissions (receive (rx) bits). In one embodiment, a set of access bits (tx/rx) may be assigned for the group of devices assigned to a controller. In addition, sets of access bits may be assigned to individual devices. In one embodiment, the group access bits take precedence when access is denied by the group bits. When access is allowed by the group access bits, the device specific bits are applicable.

Figure 6:
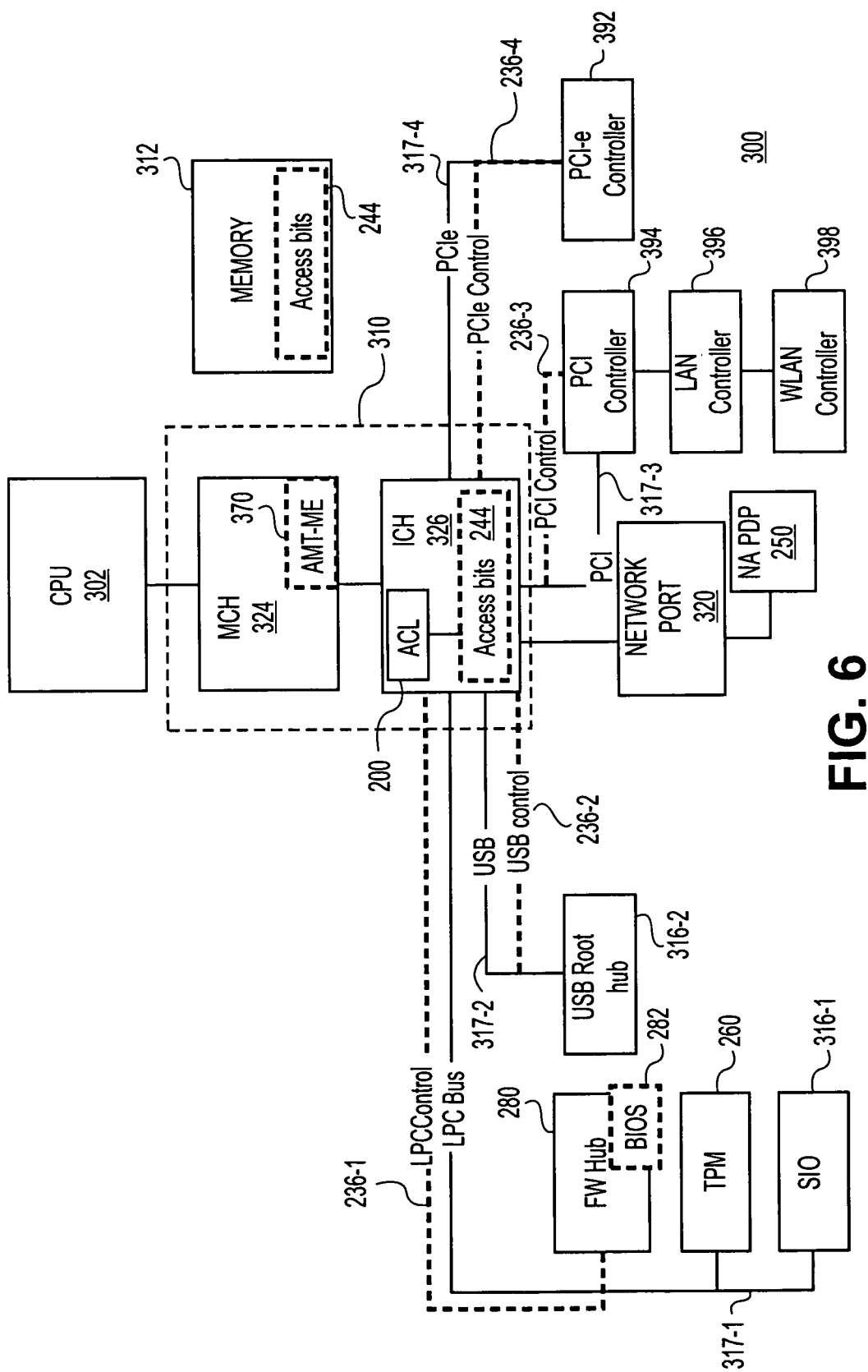
FIG. 6 is a block diagram further illustrating the hardware platform of FIG. 1 to provide access control logic, in accordance with one embodiment.

In one embodiment, a manageability processor (MP), for example, as shown in FIG. 6, may control the polarity of the data access bits. In a further embodiment, the MP and its operational rules are controlled by the PDP 250 in the form of filtering rules (e.g., setting for access bits regarding the various enumerated platform resources of client platform 100). Accordingly, once the platform configuration status information is generated, such information may be sent to the PDP 250. In response to such information, said PDP 250 may generate an access control policy with which the client platform 100 must comply prior to receiving network access.

FIG. 3 is a block diagram further illustrating network access PDP 250 of FIG. 1, according to one embodiment. Representatively, network access PDP 250 may include network access control (NAC) logic 252. In one embodiment, NAC logic 252 may generate a request for an NAC report to an access requester (AR), such as client platform 100. In response to the receipt of such report, NAC logic 252 may direct platform configuration verification logic 254 to compare the platform configuration status information of client platform 100 (FIG. 1) to evaluate the enumerated platform resource information and compare such enumerated platform resource information to, for example, an enterprise policy for properly configured clients in terms of supported peripheral devices, busses, interconnects and resources.

In one embodiment, PDP 250 may identify client platform 100 as having non-compliant configuration status and construct an access control policy in terms of access bits that satisfy the policy. Accordingly, in one embodiment, as described herein, an access control policy may refer to the setting of the various access bits 244 (FIG. 2) to enable or disable the various enumerated platform resources of client platform 100. In one embodiment, network access PDP 250 may include access control policy logic 256, which is responsible for generating one or more I/O filter rules using, for example, I/O filter logic 258 to indicate for the client platform which of the various enumerated platform resources must be either enabled or disabled to receive access to network 122 (FIG. 1).

Referring again to FIG. 2, ACL logic 200 may include conditional control logic 240, which is responsible for implementing or modifying the configuration of client platform 100 to provide compliance with the access control policy received from network access PDP 250. Representatively, conditional control logic 240 may be responsible for enabling and disabling the various enumerated platform resources of client platform based on access bits 244. In one embodiment, ACL logic 200 may permit control messages generated by devices including dynamic attachment or detachment of a device to a bus such that access bits 244 can be configured to a default policy (when no device is present).

In one embodiment, a manageability engine (ME) may poll (or trigger controller polling) of a bus to discover configuration changes where bus logic does not generate control events. Accordingly, in one embodiment, in response to receipt of an I/O filter rule as part of an access control policy, I/O filter logic 242 may direct conditional control logic 240 to modify the various access bits 244, such that conditional control logic 240 may disable at least one enumerated platform resource of client platform 100 to comply with the received access control policy.

In one embodiment, enforcement of various access control policies may require participation of run-time environments, such as operating system (OS) drivers, active management technology (AMT) manageability engines (ME) (AMT-ME), AMT processors (AMT-P), input/output (I/O) devices, or, for example, an I/O controller hub (ICH), depending upon implementation choices. In one embodiment, the I/O filter rules may be implemented as a state machine for each peripheral device, individually or collectively, for all the devices attached to a bus. Accordingly, in one embodiment, conditional control logic 240 may include a state machine to direct, for example, an I/O controller hub (ICH) to enable/disable the various devices for use within client platform 100. Accordingly, in one embodiment, I/O filter rules are used to program access bits 244.

In one embodiment, more sophisticated I/O filters may be used to process data portions of bus traffic to identify and clean malicious content (e.g., viruses, worms). In this manner, a comprehensive antivirus scan can be applied, even when a source device is not a storage device. Accordingly, in one embodiment, chipset 110 may include mandatory access control for implementing one or more filters to process data portions of bus traffic to identify and clean malicious content. In one embodiment, platform configuration status reports of I/O filters and enumerated platform resources ("platform configuration status") are protected by one or more trusted platform modules (TPM), where a hash of the configuration state may be extended into platform configuration registers (PCR) and made available for later use (such as, reporting to a PDP).

A "cryptographic operation" is an operation performed for additional data security. For example, one type of cryptographic operation involves digital signing information to produce a digital signature. This digital signing operation may be in accordance with Digital Signature Algorithm (DSA). Another type of cryptographic operation involves hashing, namely a one-way conversion of information to a fixed-length representation. Often, this representation, referred to as a "hash value" or an "identifier", is substantially less in size than the original information. It is contemplated that, in some cases, a 1:1 conversion of the original information may be performed.

Figure 4:
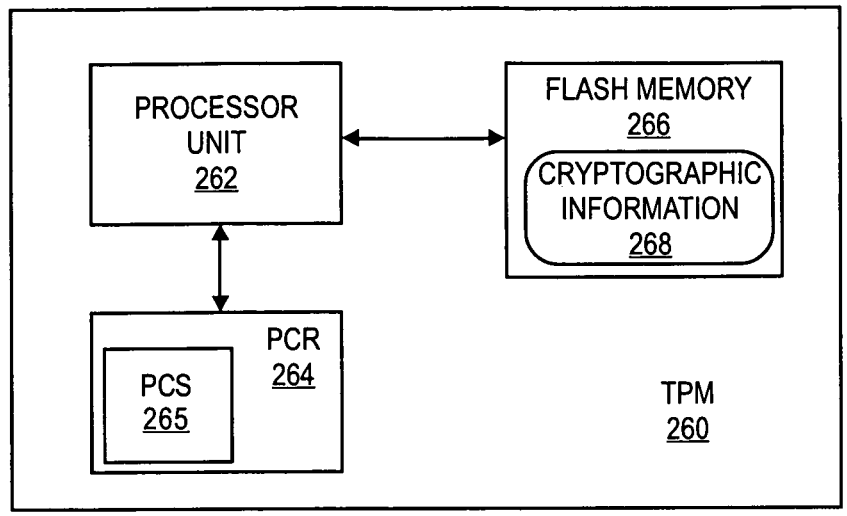
FIG. 4 is a block diagram illustrating a trusted platform module, which may incorporated into a platform configuration as shown in FIG. 1 to enable access control logic according to one embodiment.

FIG. 4 further illustrates Trusted Platform Module (TPM) 260 of client platform 100, in accordance with one embodiment. TPM 260 is a cryptographic device that is manufactured by a device manufacturer. In one embodiment, TPM 260 comprises processor unit 262 with a small amount of on-chip memory encapsulated within a package. In one embodiment, the encapsulated memory may be used to store an endorsement key pair received from a certifying manufacturer. In one embodiment, TPM 260 further comprises non-volatile memory 264 (e.g., flash) to permit storage of cryptographic information 266 such as one or more of the following: keys, hash values, signatures, certificates, etc. As described herein, keys protected by TPM 260 by encrypting the keys with a respective parent key contained in a sealed storage of TPM 260 are referred to as "TPM keys." In one embodiment, the cryptographic information is a cryptographic key received from a certifying manufacturer.

As shown below, a hash value of "X" may be represented as "Hash(X)". Of course, it is contemplated that such information may be stored within external memory 112 of platform 100 in lieu of flash memory 266. The cryptographic information may be encrypted, especially if stored outside TPM 260.

As further illustrated, TPM 260 includes platform configuration registers (PCR) 264, which may be used to store, for example, platform metrics to perform a PCR binding between data protected by TPM 260 and/or a platform configuration status (PCS) 265 that is required before PDP 250 (FIG. 3) allows client platform 100 network access.

Figure 5:
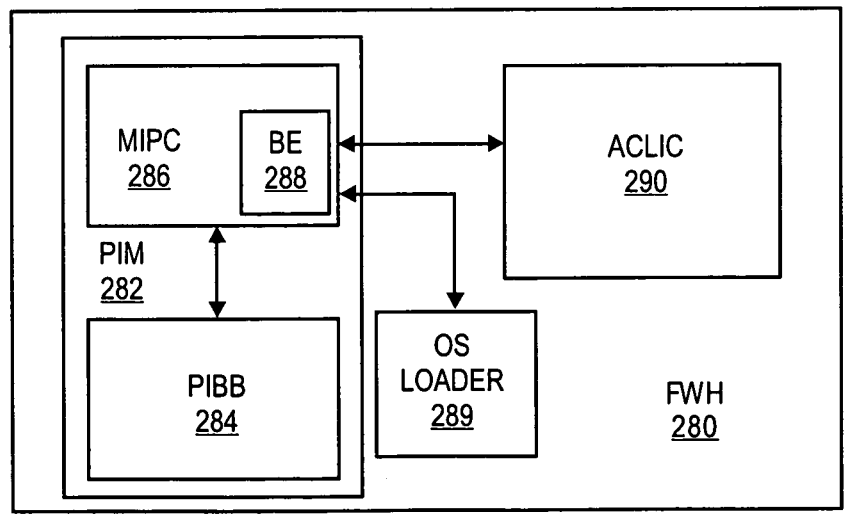
FIG. 5 is a block diagram further illustrating firmware hub (FWH) of FIG. 1, in accordance with one embodiment.

FIG. 5 further illustrates FWH 289 of FIG. 1, according to one embodiment. In one embodiment, ACL initialization code (ACLIC) bootstraps client platform 100 to enable ACL 200 according to a previously stored platform configuration status. Representatively, platform initialization module (PIM) 282 may include a platform initialization boot block (PIBB) 284 and a main platform initialization code (MPIC) 286. In one embodiment, MPIC 286 is modified to invoke ACLIC 290 to bootstrap the platform 100 to enable dynamic provisioning of an access control policy within a controller hub. In one embodiment, this trusted platform bootup state may be measured to generate a digest value, which is stored within PCRs 264, as shown in FIG. 4 to enable subsequent detection of a trusted platform bootup state by network access PDP 250.

In one embodiment, as shown in FIG. 5, MIPC 286 may include bus enumerator (BE) 288 to enable enumeration of the various enumerated platform resources of client platform 100, as shown in FIG. 1. In one embodiment, the various blocks loaded within firmware or FWH 280 may be referred to herein as "firmware." Generally, two classes of firmware are prevalent today: legacy firmware and IPF (Itanium family of processors) firmware, running the extensible firmware interface (EFI) firmware interface. Accordingly, as shown in FIG. 5, PIM 282 including OS loader 289 may refer to legacy firmware.

In one embodiment, BIOS logic may be implemented using an EFI firmware interface to provide, for example, an operating system (OS) of client platform 100 access to firmware components. Firmware components including a system abstraction layer (SAL) and a processor abstraction layer (PAL) are collectively referred to herein as "IPF firmware." According to IPF firmware, SAL is the firmware layer that isolates an operating system and higher level software from implementation differences in the platform. Conversely, PAL provides a consistent software interface to access the processor resources across different processor implementations and encapsulates all processor mode specific hardware.

Accordingly, SAL, which is similar to a basic input/output system (BIOS) may, during boot-up of client platform 100, interact with an OS to load portions of the operating system into memory. Accordingly, SAL may be responsible for performing the functionality of PIM 282 to launch ACLIC 290. Accordingly, during the boot-up of client platform 100, SAL is responsible for performing tests, initialization and loading of the first level of the operating system loader 289. As part of this process, the SAL would load ACLIC 290 to enable dynamic provisioning of an access control policy within a controller hub, according to one embodiment.

FIG. 6 is a block diagram illustrating client platform hardware 300, including access control logic, or ACL 200, to enable dynamic provisioning of an access control policy in an I/O controller hub (ICH) 326, in accordance with one embodiment. Representatively, chipset 310 is provided with a memory controller hub (MCH) 324, as well as an I/O controller hub, or ICH, 326. Representatively, ICH 326 includes access control logic 200, including access bits 244. As further illustrated, MCH 324 includes an AMT client manageability processor (AMT-ME) 370.

In one embodiment, AMT-ME 370 may receive I/O filter rules and apply the various I/O filter rules to the ICH 326 to modify access bits 244. However, in alternative embodiments, application of the access control policy may be implemented using various techniques for exploiting the native control capabilities of a device or bus. In particular, the AMT-ME 370, in one embodiment, may refer to access bits 244 stored in system memory 312 to control device interactions as part of servicing I/O requests, such that any I/O requests from disabled devices are ignored.

Although illustrated to include manageability processor 370, in one embodiment, manageability processor 370 may be incorporated within ACL logic 200, as shown in FIG. 2. Accordingly, in response to a network connectivity request via network port 320 for access to a network, ACL may establish low pin count (LPC) control channel 236-1, Universal Serial Bus (USB) control channel 236-2, peripheral component interconnect (PCI) control channel 236-3 and PCI Express (PCIe) control channel 236-4 to enable the receipt of status information regarding the various controllers and devices attached to ICH 326. Representatively, PCI Express bus 317-4 couples a PCI Express controller 392 to ICH 326. In addition, PCI bus 317-3 couples PCI controller 394, local area network (LAN) controller 396 and wireless local area network (WLAN) controller 398 to ICH 326. In addition, USB 317-2 couples USB route hub 316-2 to ICH, whereas LPC bus 317-1 couples TPM 260 and super I/O (SIO) 316-1 to ICH 326.

In the embodiment illustrated in FIG. 6, TPM 260 is shown as separate from chipset 310. However, in the embodiments described, TPM 260 may be either incorporated within chipset 310 within, for example, MCH 324, ICH 326, or shown as a separate component, as shown in FIG. 6, while remaining within the scope of the above-described embodiments and claims. Accordingly, based on settings of access bits for the various controllers and devices attached to client platform 300, PDP 250 evaluates such settings and determines whether the platform configuration for client platform 300 complies with a network access policy.

In one embodiment, ME 370 may be directed to issue a signal to ICH 326 to enable network access if PDP 250 detects a compliant configuration. In a further embodiment, when an access control policy including at least one I/O filter is transmitted to ME 370 based on a non-compliant client platform configuration, ME 370 may be responsible for setting access bits 344 based on one or more received I/O filter rules. Based on such setting of access bits, conditional control logic of ACL would either enable or disable the various enumerated platform resources to conform client platform configuration to a compliant platform 300 to enable network access. Procedural methods for implementing one or more of the embodiments are now described.

Operation

Figure 7:
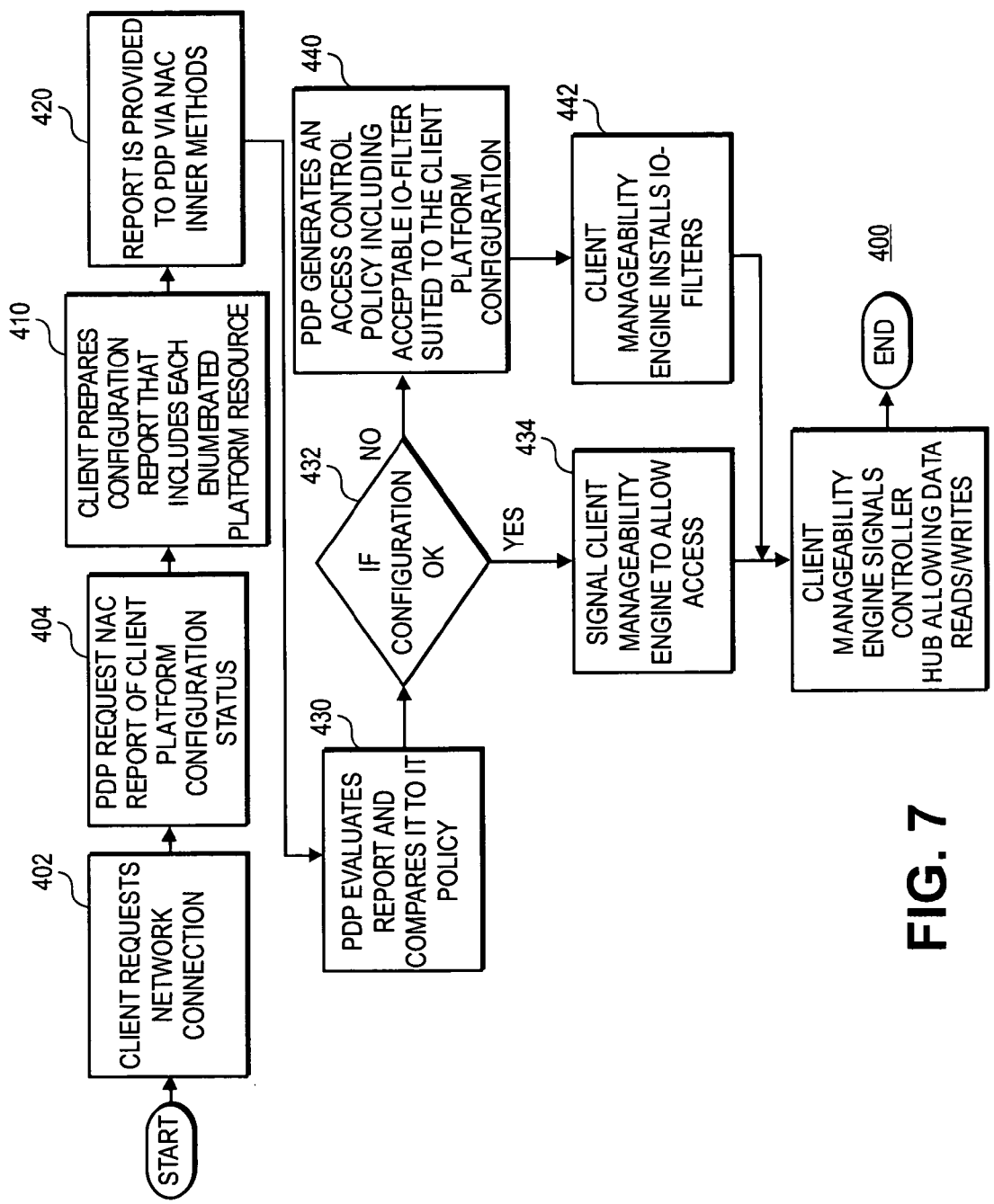
FIG. 7 is a flowchart illustrating a method for dynamic provisioning of an access control policy in a controller hub according to one embodiment.

Turning now to FIG. 7, the particular methods associated with various embodiments are described in terms of computer software and hardware with reference to a flowchart. The methods to be performed by a computing device (e.g., a hub controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments of the invention as described herein.

Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flowchart illustrating a method 400 that combines network access control (NAC) technology with controller hub switching capabilities resulting in the ability for enterprise information technology (IT) personnel to provision a peripheral-oriented access control policy as part of a received network access request, in accordance with one embodiment. In the embodiments described, examples of the described embodiments will be made with reference to FIG. 1. However, the described embodiments should not be limited to the examples provided to limit the scope provided by the appended claims.

Referring again to FIG. 7, at process block 402, a client platform request connectivity via, for example, an 802.1X control channel via, for example, an attached wired or wireless network interface card (NIC). For example, as shown in FIG. 6, client platform 300 would request network connectivity via, for example, an 802.1X control channel via an attached wired or wireless NIC of network port 320. In response to such request, at process block 404, a network policy decision point (PDP) requests network access control (NAC) authentication extensions to typical 802.1X authentication methods, for example, as described by IEEE Std. 802.1X-2001.

Referring again to FIG. 7, at process block 410, the client platform prepares the configuration report that includes each enumerated platform resource. For example, as shown in FIG. 6, enumerated platform (controller) resources could include serial I/O (SIO) device 316-1, USB router hub 316-2, PCI controller 394, LAN controller 396, WLAN controller 398, PCI Express controller 392, LPC bus 317-1, USB bus 317-2, PCI bus 317-3 and PCI Express bus 317-4. As indicated above, such attached busses, point-to-point interconnects (e.g., PCI Express), devices and controllers are referred to herein as enumerated platform resources. In addition to the enumerated platform resources, the NAC report includes a status bit, referred to herein as an "access bit" for each enumerated platform resource to indicate whether the enumerated platform resource is enabled/disabled for system use.

Accordingly, at process block 420, the report is provided to the PDP via NAC inner methods, as described, for example, by the IEEE Std. 802.1X-2001. Accordingly, in one embodiment, as shown at process block 420, the client platform returns platform configuration status information, including a list of each enumerated platform resource and access bits regarding whether such enumerated platform resource is enabled/disabled for system use. At process block 430, the policy decision point evaluates the report and compares it to an IT policy.

In one embodiment, for example, as shown in FIG. 6, NAPDP 250 evaluates the platform configuration status and compares it to an enterprise policy for properly configured client platforms in terms of supported peripherals, busses and interconnects. Based on such comparison, at process block 432, it is determined whether the client platform is identified as having a compliant configuration. If the client platform is identified as having a non-compliant configuration at process block 440, the PDP generates an access control policy, including at least one I/O filter suited to the client platform configuration.

Accordingly, in one embodiment, the access control policy generated by the PDP, for example, such as PDP 250 as shown in FIG. 6, is constructed in terms of the access bits that satisfy the policy. In other words, the settings of the various access bits within the access control policy will disable or enable one or more of the enumerated resources of the client platform 300, for example as shown in FIG. 6, to convert the client platform configuration into a compliant configuration. In one embodiment, the access control policy, including the at least 110 filter, is provisioned to the client platform as part of an 802.1X inner method (or as part of a later manageability protocol exchange).

In response to receipt of the access control policy, at process block 442, a client manageability engine installs the at least one I/O filter of the received access control policy. For example, as shown in FIG. 6, AMT-ME 370 directs ICH 326 to modify access bits 244. Accordingly, in one embodiment, the at least one 110 filter rule provided in a received access control policy from NAPDP 250 is used to program, for example, ICH access bits 244. In one embodiment, programming such access bits 244 will direct, for example, conditional control logic 240, as shown in FIG. 2, to disable at least one enumerated platform resource of client platform 300 to convert the client platform configuration into a compliant platform configuration according to the received access control policy.

Referring again to FIG. 7, at process block 432, if the client platform configuration is identified as a compliant configuration, at process block 434, the network PDP would signal the client manageability engine to allow access to the network. Accordingly, once the client manageability engine is signaled to allow access at process 434, or the client manageability engine has installed the at least one I/O filter received with the access control policy at process block 442, at process block 450, the client manageability engine signals the controller hub to allow data reads and writes.

In one embodiment, the signaling from the client manageability engine to the controller hub is performed during the evaluation stages of the network access request issued by the client platform at process block 402. As described above, the creation of a control channel, for example, using control channel logic 234 (FIG. 2), allows each of the enumerated platform resources to be rendered inaccessible during the evaluation stages of the network access request, but permits the status of enumerated platform resources to be returned out-of-band (over the control channel). Accordingly, in one embodiment, while enumerated platform resources are disabled, no data reads or writes may be processed by the client platform. Accordingly, as shown in FIG. 7, each enumerated platform resource of the client platform is disabled from data reads and data writes until the client platform is allowed access to the network either by having a compliant configuration or by modifying the platform configuration by installing one or more I/O filters to convert the client platform configuration into a compliant configuration.

Accordingly, in contrast to conventional devices, which relay on bus enumeration to poll bus controllers for a signal indicating presence, enumerated platform resources, as shown in FIG. 6, are prohibited from sending or receiving data during receipt of the poll/enumeration signal. Conversely, conventional bus enumeration allows data reads and writes during bus enumeration regardless of a client network connection state. Accordingly, in one embodiment, the use of a control channel prevents other messages from flowing during enumeration of platform resources.

Accordingly, using ACL logic 200, for example as shown in FIG. 2, an IT administrator may establish a policy regarding properly configured peripherals and apply this policy prior to permitting network access. As a result, unacceptable peripheral devices may be disabled until explicitly enabled by the network access policy. In one embodiment, ACL 200 may be used to validate and reset (if needed) the configuration of active/inactive I/O ports prior to connecting the client end point to an enterprise or commercial network. Accordingly, by doing so, IT administrators may prohibit potentially compromised client platforms from accessing an enterprise or commercial network until the various enumerated platform resources of the client platform are disabled to prohibit the client platform from compromising the enterprise or commercial network. Accordingly, in one embodiment, ACL 200 extends the controllability of I/O ports and interfaces to promote management authority using existing and new end point access control structures.

Figure 8:
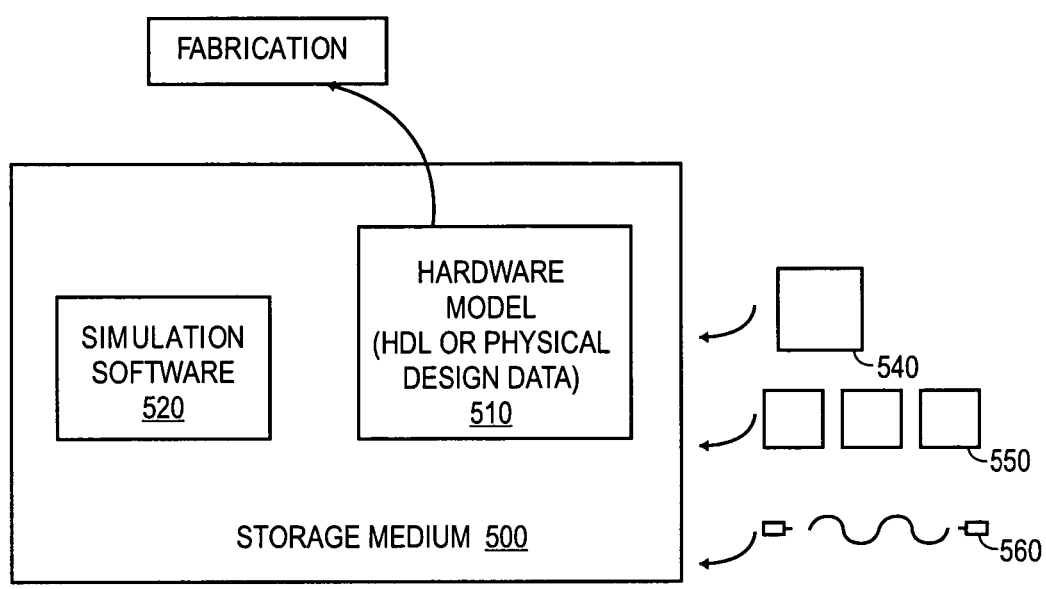
FIG. 8 is a block diagram illustrating various design representations or formats for emulation, simulation and fabrication of a design using the disclosed techniques.

FIG. 8 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite (not shown) to the hardware model to determine if it indeed functions as intended. In some embodiments, the simulation software is not recorded, captured or contained in the medium.

In any representation of the design, the data may be stored in any form of a machine readable medium. An optical or electrical wave 560 modulated or otherwise generated to transport such information may be a machine readable transmission medium. A memory 550 or a magnetic or optical storage 540, such as a disk, may be a machine readable storage medium. Any of the transmission mediums may carry the design information. The term "carry" (e.g., a machine readable medium carrying information) thus covers information encoded or modulated into or onto a carrier wave. The set of bits describing the design or a particular of the design are (when embodied in a machine readable medium, such as a storage medium) an article that may be sealed in and out of itself, or used by others for further design or fabrication.

ALTERNATE EMBODIMENTS

It will be appreciated that, for other embodiments, a different system configuration may be used. For example, while the system 100 includes a single CPU 102, for other embodiments, a symmetric multiprocessor system (SMP) (where one or more processors or processor cores may be similar in configuration and operation to the CPU 102 described above) may benefit from the dynamic provisioning of an access control policy to a controller hub of various embodiments. Further different types of systems, or different types of computer systems (for example, a server, a workstation, a desktop computer system, a gaming system, an embedded computer system, a blade server, etc.), may be used for other embodiments.

Elements of embodiments may also be provided as an article of manufacture including a machine-readable storage medium for storing the machine-executable instructions. The machine-readable storage medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other types of machine-readable storage media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that throughout this specification "one embodiment" or "an embodiment" refers to a particular feature, structure or characteristic described in connection with the embodiment and included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The foregoing detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. Client platform hardware, comprising:
   a central processing unit (CPU) coupled to a memory controller hub (MCH), the MCH coupled to an input/output (I/O) controller hub (ICH), the MCH and ICH, when viewed as a whole, being integrated with access control circuitry and trusted platform circuitry, said MCH having a first interface to said CPU, said MCH having a second interface to a main memory, and said ICH having a plurality of I/O interfaces to engage in communication with a plurality of I/O devices;
   said access control circuitry comprising logic to: i) establish an out-of-band control channel with an I/O device, wherein, while the control channel is established, the I/O device is disabled from performing reads and writes of the client platform hardware, wherein the control channel collects platform configuration status information from the I/O device, and wherein the access control circuitry collects enablement/disablement platform configuration status information from each of the plurality of I/O devices; ii) issue a network connection request to a policy decision point remotely coupled to said client platform hardware through a network; iii) receive in response to said policy decision point having received said network connection request, a request from said policy decision point asking for platform configuration status information; iv) respond to the request from said policy decision point by providing the requested platform configuration status information, the platform configuration status information identifying each I/O device and its respective enabled/disabled status; v) receive an access control policy sent by said policy decision point in response to said policy decision point having received said platform configuration status information, said access control policy indicating desired enabled/disabled status for each of said I/O devices; and vi) enabling or disabling said I/O devices in accordance with said policy decision point;

said trusted platform circuitry to encrypt said platform configuration status information prior to its being sent to said policy decision point, said trusted platform circuitry further comprising flash memory that stores one or more of the following for the encryption: a) keys; b) hash values; c) signatures; and d) certificates.

2. The semiconductor chip circuitry of claim 1 wherein said access control circuitry further comprises logic to establish respective control channels with said I/O interfaces and receive respective status information from said I/O interfaces.

3. The semiconductor chip circuitry of claim 2 wherein said I/O interfaces are disabled from general purpose reads and writes while said respective status information is being obtained by said access control circuitry.

4. The semiconductor chip circuitry of claim 2 wherein said respective control channels include one or more of:
a) a low pin count control channel;
b) a USB control channel;
c) a PCI control channel;
d) a PCIe control channel.

5. The semiconductor chip circuitry of claim 1 wherein said access control circuitry further comprises logic to prepare and send said configuration information to said policy decision point.

6. The semiconductor chip circuitry of claim 5 wherein said trusted platform circuitry further comprises processor logic circuitry coupled to said flash memory.

7. A computing system, comprising:
a main memory;
a central processing unit (CPU) coupled to a memory controller hub (MCH), the MCH coupled to an input/output (I/O) controller hub (ICH), the MCH and ICH, when viewed as a whole, being integrated with access control circuitry and trusted platform circuitry, said MCH having a first interface to said CPU, said MCH having a second interface to said main memory, and said ICH having a plurality of I/O interfaces to engage in communication with a plurality of I/O devices;
said access control circuitry comprising logic to: i) establish an out-of-band control channel with an I/O device, wherein, while the control channel is established, the I/O device is disabled from performing reads and writes of the client platform hardware, wherein the control channel collects platform configuration status information from the I/O device, and wherein the access control circuitry collects enablement/disablement platform configuration status information from each of the plurality of I/O devices; ii) issue a network connection request to a policy decision point remotely coupled to said client platform hardware through a network; iii) receive in response to said policy decision point having received said network connection request, a request from said policy decision point asking for platform configuration status information; iv) respond to the request from said policy decision point by providing the requested platform configuration status information, the platform configuration status information identifying each I/O device and its respective enabled/disabled status; v) receive an access control policy sent by said policy decision point in response to said policy decision point having received said platform configuration status information, said access control policy indicating desired enabled/disabled status for each of said I/O devices; and vi) enabling or disabling said I/O devices in accordance with said policy decision point;

said trusted platform circuitry to encrypt said platform configuration status information prior to its being sent to said policy decision point, said trusted platform circuitry further comprising flash memory that stores one or more of the following for the encryption: a) keys; b) hash values; c) signatures; and d) certificates.

8. The computing system of claim 7 wherein said access control circuitry further comprises logic to establish respective control channels with said I/O interfaces and receive respective status information from said I/O interfaces.

9. The computing system of claim 8 wherein said I/O interfaces are disabled from general purpose reads and writes while said respective status information is being obtained by said access control circuitry.

10. The computing system of claim 7 wherein said respective control channels include one or more of:
a) a low pin count control channel;
b) a USB control channel;
c) a PCI control channel;
d) a PCIe control channel.

11. The computing system of claim 7 wherein said access control circuitry further comprises logic to prepare and send said configuration information to said policy decision point.

12. The computing system of claim 11 wherein said trusted platform circuitry further comprises processor logic circuitry coupled to said flash memory.

* * * * *